US011389909B2

(12) United States Patent
Colombo et al.

(10) Patent No.: US 11,389,909 B2
(45) Date of Patent: Jul. 19, 2022

(54) METHOD AND TOOL FOR RECONDITIONING A DAMAGED THREAD

(71) Applicant: LEONARDO S.P.A., Rome (IT)

(72) Inventors: Dario Colombo, Samarate (IT);
Roberto Regonini, Samarate (IT);
Sergio Fiorio, Samarate (IT)

(73) Assignee: LEONARDO S.P.A., Rome (IT)

( * ) Notice: Subject to any disclaimer, the term of this patent is extended or adjusted under 35 U.S.C. 154(b) by 0 days.

(21) Appl. No.: 17/055,030

(22) PCT Filed: Oct. 17, 2019

(86) PCT No.: PCT/IB2019/058874
§ 371 (c)(1),
(2) Date: Nov. 12, 2020

(87) PCT Pub. No.: WO2020/079645
PCT Pub. Date: Apr. 23, 2020

(65) Prior Publication Data
US 2021/0229199 A1    Jul. 29, 2021

(30) Foreign Application Priority Data
Oct. 17, 2018 (EP) .................................... 18201060

(51) Int. Cl.
*B23P 6/00* (2006.01)
*B64F 5/40* (2017.01)
(Continued)

(52) U.S. Cl.
CPC ............. *B23P 6/00* (2013.01); *B23B 49/023* (2013.01); *B23B 49/026* (2013.01); *B23G 1/16* (2013.01); *B64F 5/40* (2017.01)

(58) Field of Classification Search
CPC ..... B23P 6/00; B64F 5/40; B23G 1/16; B23B 49/023; B23B 49/026
See application file for complete search history.

(56) References Cited

U.S. PATENT DOCUMENTS

| 3,148,562 A | 9/1964 | Moss |
| 4,759,666 A | 7/1988 | Grab |
(Continued)

FOREIGN PATENT DOCUMENTS

| AU | 508973 B2 * | 4/1980 |
| DE | 9101752 U1 * | 6/1991 |
(Continued)

*Primary Examiner* — Eric A. Gates
(74) *Attorney, Agent, or Firm* — Leason Ellis LLP

(57) ABSTRACT

It is described a method for reconditioning a damaged thread (8) of a transmission (1) of a hover-capable aircraft; the damaged thread (8) being arranged inside a first hole (23a) of the transmission (1); wherein the method includes the following steps: i) centering a tool (20) on the first hole (23a); ii) inserting a first tool (25) inside the tool (20) centred on the first hole (23a) and removing the damaged thread (8) through the first tool (25); iii) inserting a second tool (26) inside the tool (20) and creating a new thread (16) inside the first hole (23a) having a diameter larger than the one of the damaged thread (8); iv) screwing an insert (61) having a thread inside the new thread (16), so that the insert (61) engages the first hole (23a) and defines a reconditioned thread (8'); and v) keeping the transmission (1) mounted on the hover-capable aircraft during steps i), ii), iii), iv).

8 Claims, 7 Drawing Sheets

(51) Int. Cl.
 *B23B 49/02* (2006.01)
 *B23G 1/16* (2006.01)

(56) References Cited

U.S. PATENT DOCUMENTS

| | | | |
|---|---|---|---|
| 6,499,918 B1 | 12/2002 | Murphy | |
| 7,229,237 B1 * | 6/2007 | Fulgham | B23B 47/284 |
| | | | 408/72 B |
| 9,782,838 B2 * | 10/2017 | Pedersen | B23B 49/026 |
| 2005/0204542 A1 | 9/2005 | Pittman | |
| 2017/0100782 A1 | 4/2017 | Pedersen | |

FOREIGN PATENT DOCUMENTS

| | | | | |
|---|---|---|---|---|
| EP | 2 522 463 | | 11/2012 | |
| EP | 2522463 A2 * | | 11/2012 | B23B 47/281 |
| EP | 2975306 | | 1/2016 | |
| GB | 1399098 A * | | 6/1975 | B23B 47/287 |

* cited by examiner

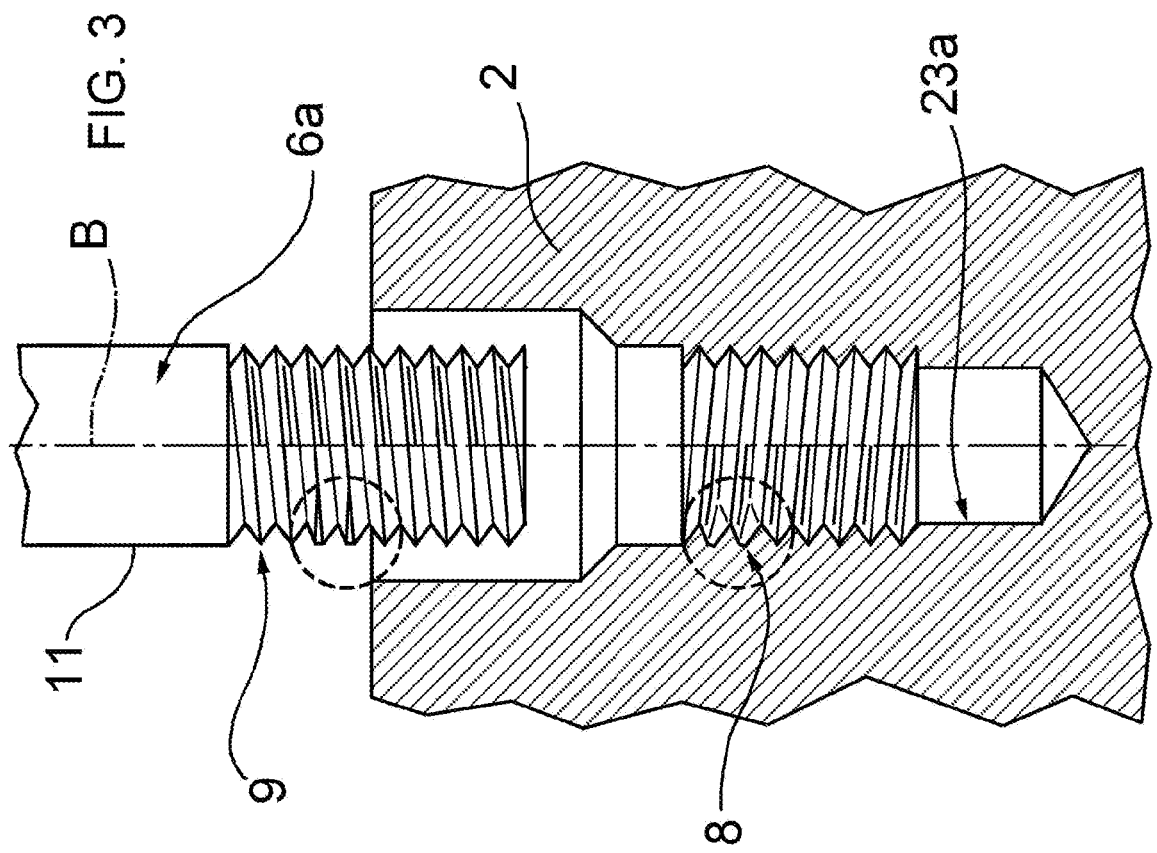
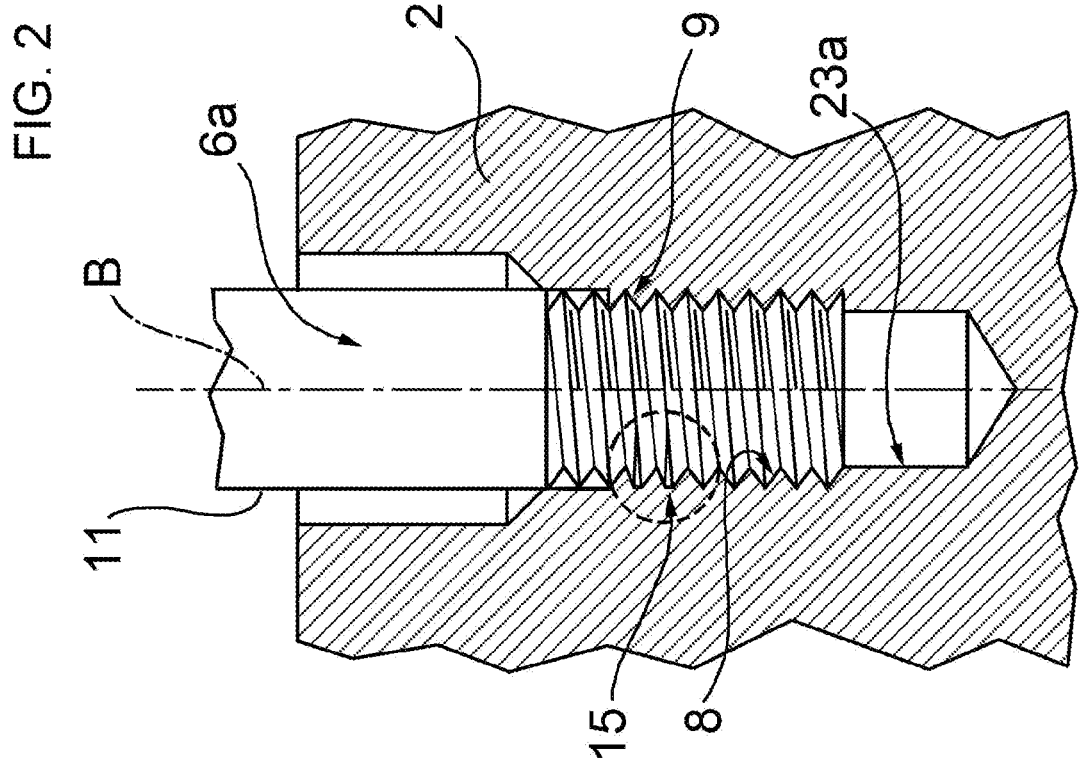

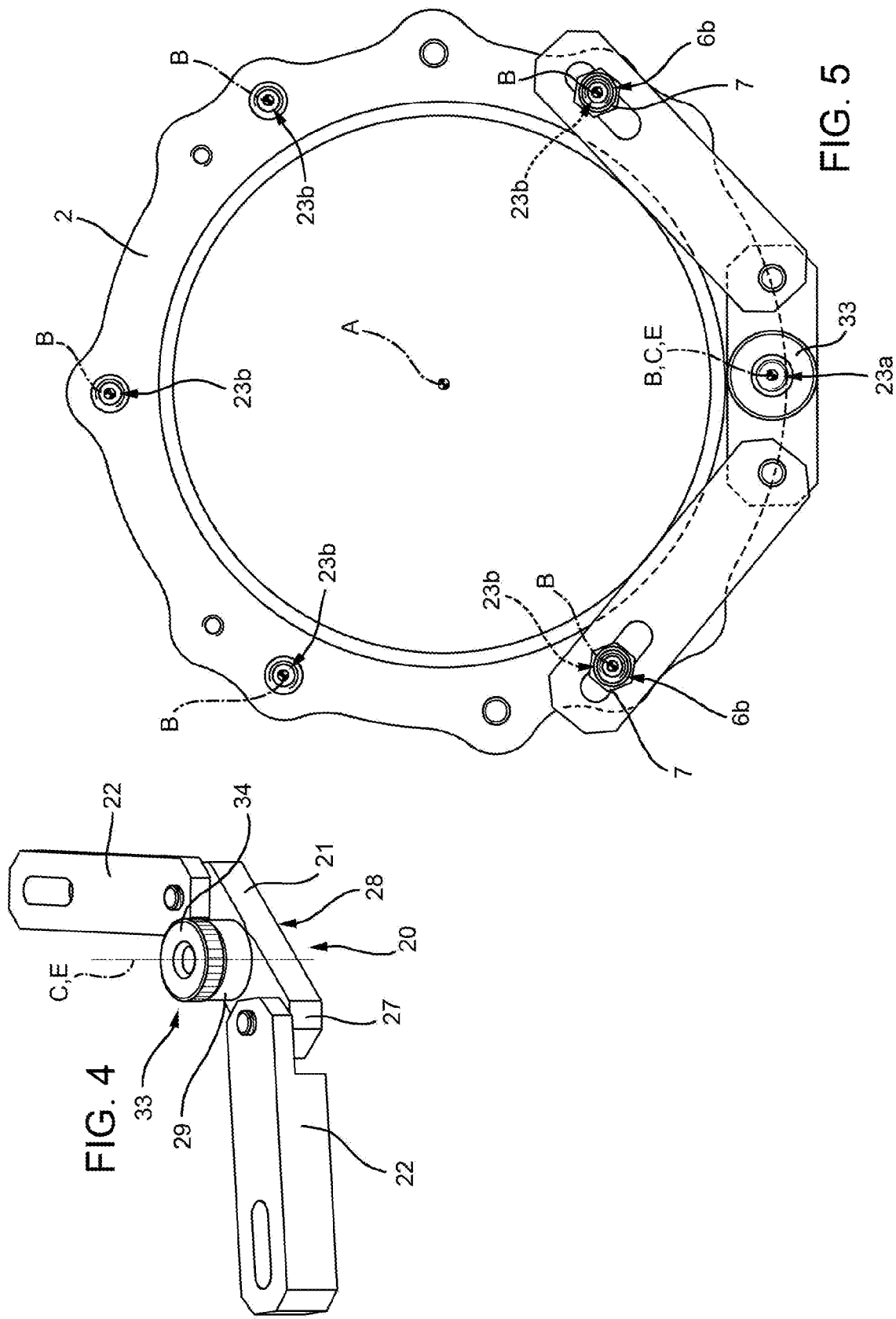

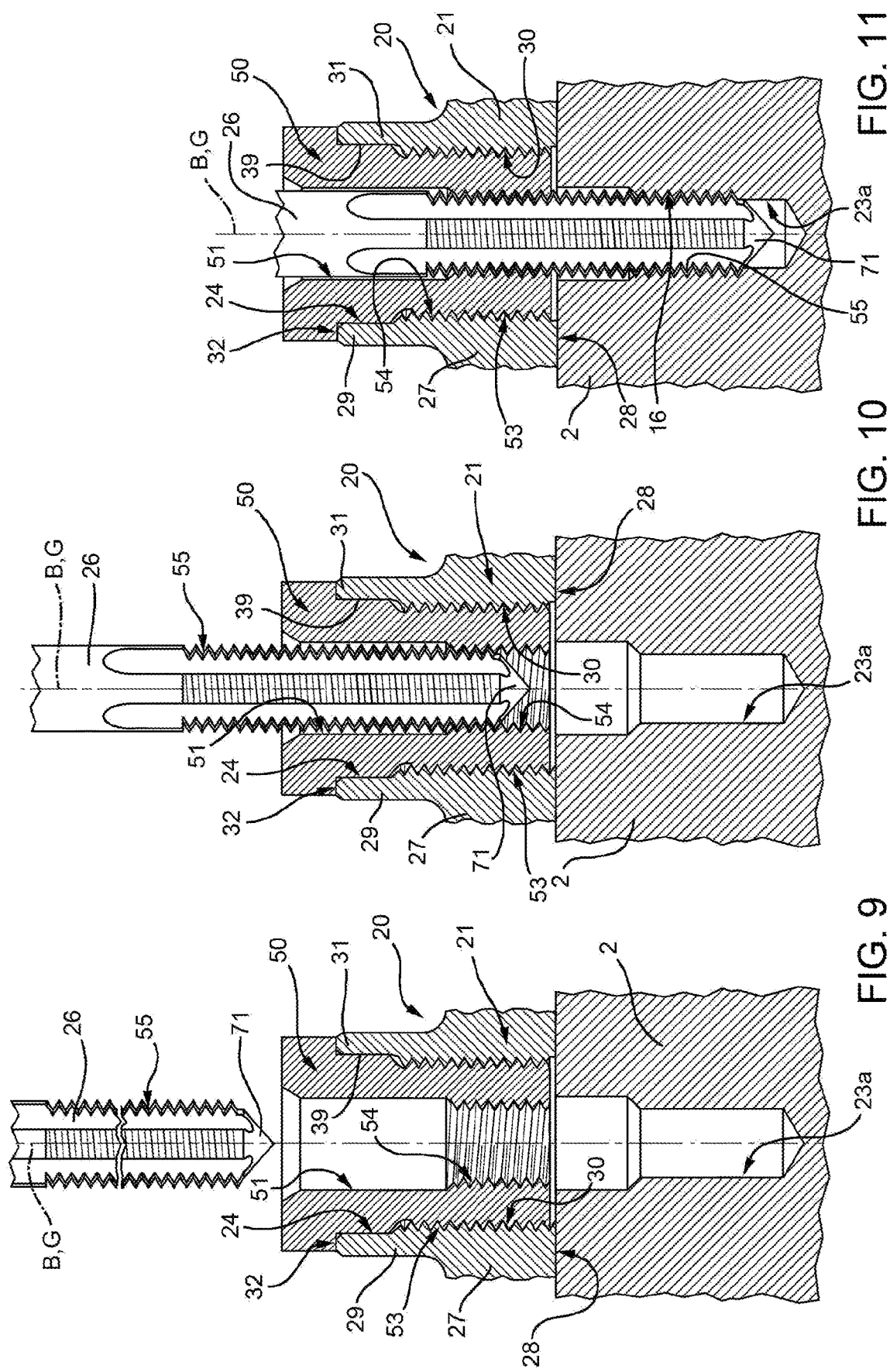

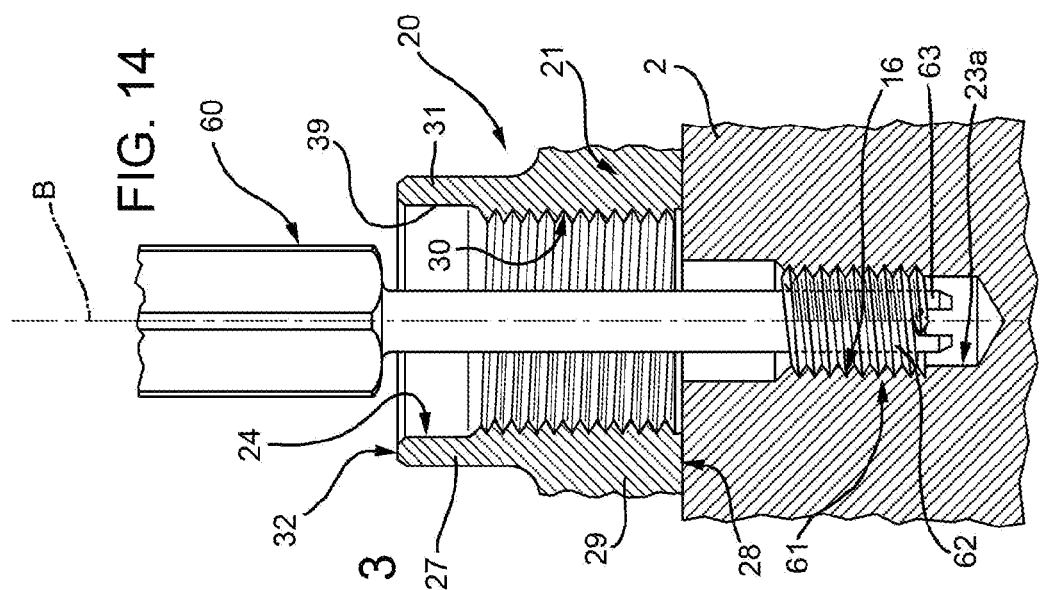
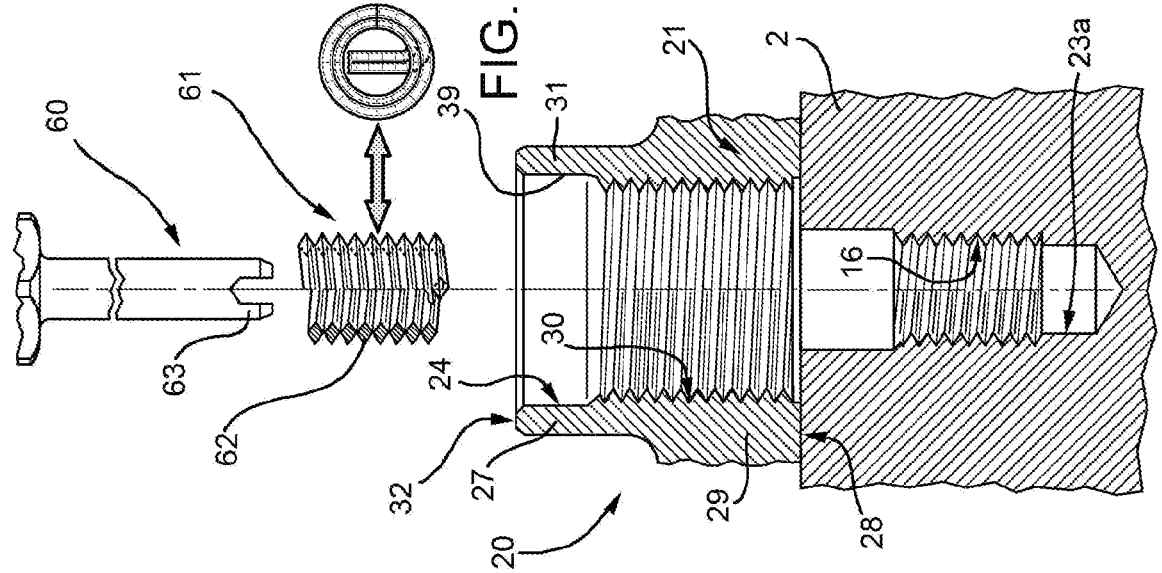
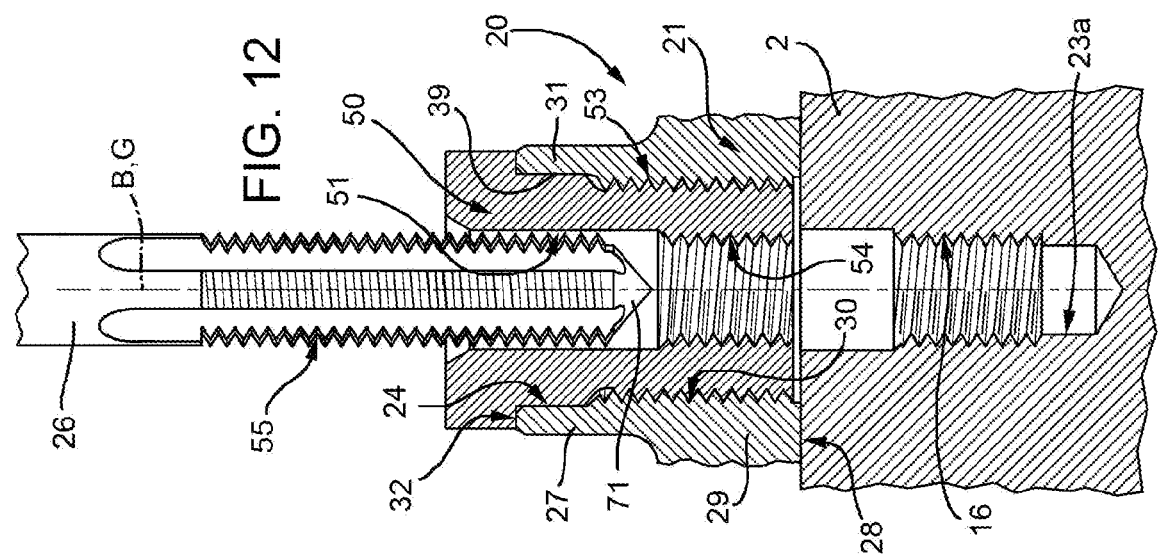

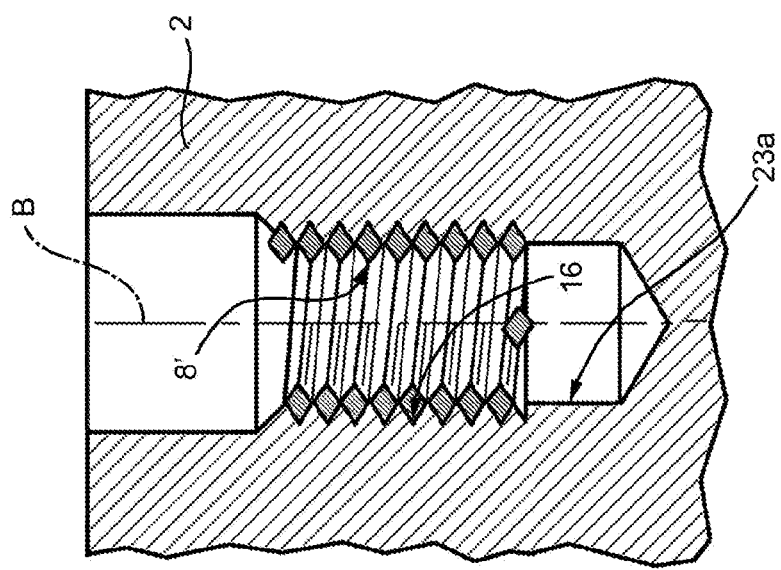
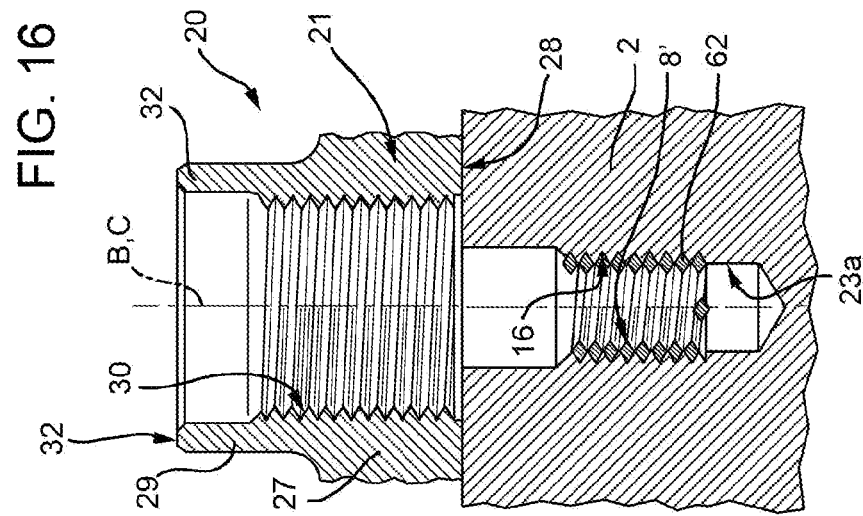
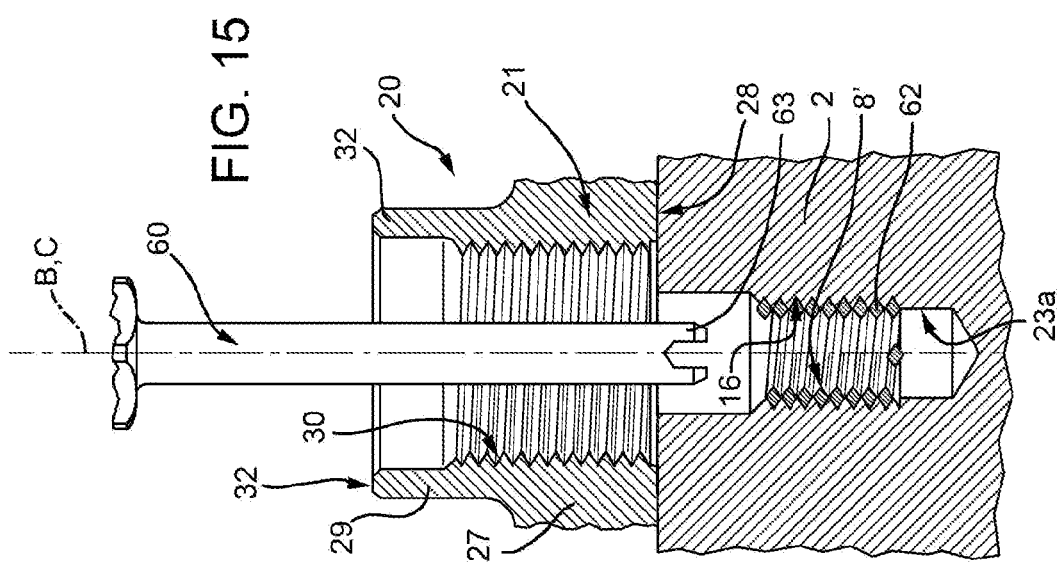

METHOD AND TOOL FOR RECONDITIONING A DAMAGED THREAD

CROSS-REFERENCE TO RELATED APPLICATIONS

This patent application is a U.S. National Phase Application under 35 U.S.C. § 371 of International Patent Application No. PCT/IB2019/058874, filed on Oct. 17, 2019, which claims priority from European patent application no. 18201060.3 filed on Oct. 17, 2018, all of which are incorporated by reference, as if expressly set forth in their respective entireties herein.

TECHNICAL FIELD

The present invention relates to a tool for reconditioning a damaged thread.

The present invention further relates to a method for reconditioning a damaged thread.

In particular, the damaged thread to be repaired is arranged inside a casing of a main transmission for a hover-capable aircraft, e.g. a helicopter or a convertiplane.

BACKGROUND ART

Helicopters comprising one or more turbines, a main rotor and a main transmission transmitting the motion from the turbines to the main rotor are known.

The main transmission is housed inside a casing rotatably supporting one or more rotating members, for example a main rotor drive shaft.

The casing is connected to an angularly fixed shell in order to prevent the casing rotation following the transmission operation.

By way of example, the casing could be made of an aluminium or magnesium alloy, and the shell could be defined by a pto of a fan for cooling the transmission oil, of a hydraulic pump, of a compressor or of any type of accessory.

EP 2975306 in the name of the same Applicant describes the use of threaded studs for releasably connecting the casing and the shell.

In particular, threaded studs essentially comprise:

a first thread screwed to a first nut screw of the casing;
a second thread screwed to a locking element, e.g. a nut; and
an unthreaded portion interposed between the first and second threads and passing through a housing of the shell with a certain clearance.

More particularly, a tightening screwing torque is exerted on the nut so as to connect the casing and the shell. Similarly, a loosening torque is exerted on the nut, if it is required to remove the connection between the casing and the shell.

Because of the friction between the threads of the nut and the second threading, such screwing and unscrewing torques can determine, besides the rotation of the nut, the undesired rotation of the threaded stud relative to the casing.

In order to avoid this undesired rotation of the threaded stud, it is known to use a toothed washer made of cadmium steel.

More precisely, the toothed washer is housed inside a housing of the casing, and comprises a first radially inner surface and a second radially outer surface, which are mutually opposite and toothed. The first radially inner surface of the washer mates with a threaded stud toothing. The second radially outer surface of the washer creates a toothing on the inner surface of the housing of the casing thanks to the fact that the toothed washer is made of steel, i.e. a material harder than the aluminium or the magnesium composing the casing.

In this way, the rotation of the threaded stud relative to the casing is prevented by the friction created between the second surface of the washer and the seat of the casing and between the first surface of the washer and the toothing of the threaded stud.

Each threaded stud can be removed by using a specific tool, which removes the washer thus allowing the threaded stud to be extracted.

The removal of the threaded studs can cause damage to the thread defined by the casing nut.

These circumstances require:

removing the entire transmission from the helicopter;
sending it to an authorized repair centre to recondition the thread;
completely disassembling the transmission to free the casing with the damaged thread from gears, bearings, shafts, etc.
arranging the casing with the damaged thread on a special machine tool present in the repair centre;
repairing the thread, reassembling the transmission with gears, bearings, shafts, etc. and sending it to the place where the helicopter is located; and
refitting the transmission with the fixed thread on the helicopter.

This procedure involves considerable costs due both to the need to transport the transmission to the repair centre and to the fact that the operation of the helicopter must be stopped for a long time.

Therefore, it is felt a need in the field to reduce as much as possible costs and time necessary to recondition the damaged threads of the casings.

U.S. Pat. No. 3,148,562 discloses a method and a tool for reconditioning a damaged thread, according to the preamble of claim 1 and 9 respectively.

DE-U-9101752 discloses an universal centering comprising three mutually displaceable elements and clamped with a countersunk screw.

DISCLOSURE OF INVENTION

The object of the present invention is to provide a method for reconditioning the damaged thread of the casing of a transmission unit of a hover-capable aircraft, according to claim 1.

The present invention further relates to a tool for reconditioning a damaged thread of a transmission of a hover-capable aircraft, according to claim 9.

BRIEF DESCRIPTION OF THE DRAWINGS

For a better understanding of the present invention, it is described hereinafter a preferred embodiment by way of non-limiting example and with reference to the attached drawings, in which:

FIGS. 2 and 3 show, in a greatly enlarged scale, the casing of the transmission unit of FIG. 1 with a damaged thread, respectively coupled and uncoupled to a stud;

FIG. 4 shows a perspective view of a tool for reconditioning the damaged thread of the casing of a transmission of a hover-capable aircraft made according to the dictates of the present invention;

FIG. 5 is a top view of the reconditioning tool of FIG. 4 during the coupling of the tool to the thread to be repaired;

FIGS. 9 to 12 show, in a greatly enlarged scale, respective successive steps for making a new thread with a larger diameter according to the reconditioning method according to the present invention;

FIGS. 13 to 15 show, in a greatly enlarged scale, respective successive steps for applying an insert with a reported thread according to the reconditioning method according to the present invention;

FIG. 16 shows, in a greatly enlarged scale, the reconditioned thread made according to the reconditioning method according to the present invention; and FIG. 17 shows a further enlarged view of some details of FIG. 16.

BEST MODE FOR CARRYING OUT THE INVENTION

Figure 1:
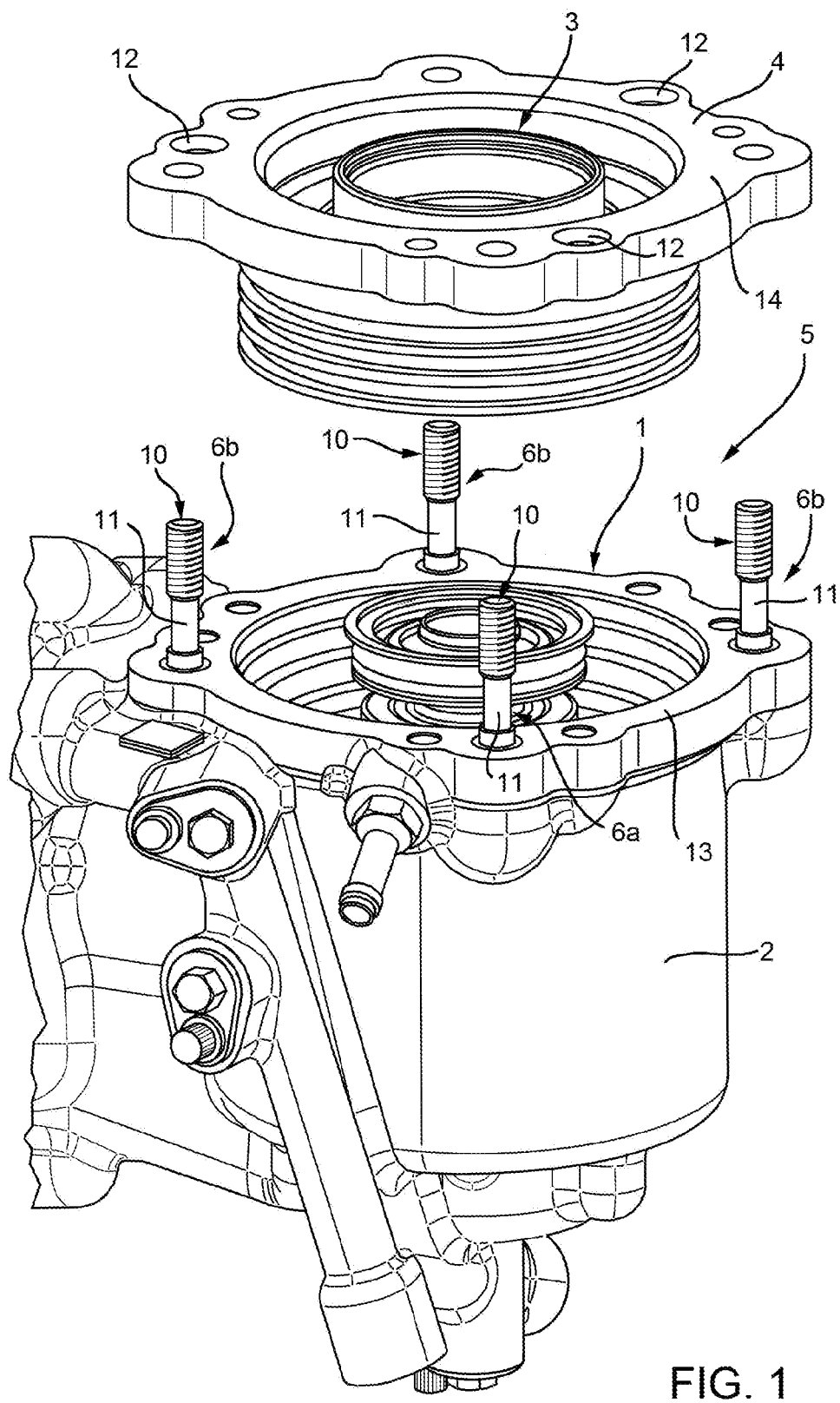
FIG. 1 is a perspective view of a casing of a transmission and of a shell for a hover-capable aircraft on which it can be used a tool according to the present invention.

With reference to FIG. 1, 1 indicates a main transmission of a hover-capable aircraft (not shown), in particular a helicopter or a convertiplane.

The transmission 1 is, in the shown case, suitable for connecting one or more turbines and a drive shaft of a main rotor (not shown).

The transmission 1 is shown in FIG. 1 only through a casing 2, which supports the drive shaft rotatable about an axis A.

With reference to FIG. 1, the reference number 3 further indicates a pto for cooling a lubricating fluid, in particular oil, for cooling the transmission 1.

The pto 3 shown in FIG. 1 is limited to a shell 4, which is angularly stationary with respect to the axis A.

The casing 2 and the shell 4 are connected by means of a plurality of connecting assemblies 5 interposed between superimposed circumferential edges 13, 14 of the casing 2 and of the shell 4.

Please note that the shell 4 does not support the transmission 1 in any way. In other words, as shown in FIG. 1, even after that the shell 4 has been removed, the transmission 1 is fully supported by the casing 2 and placed on the casing 2.

In the shown case, the casing 2 is made of aluminium or magnesium.

The casing 2 and the shell 4 are connected by means of a plurality of connecting assemblies 5 angularly equidistant about the axis A.

The following description refers to a single connecting assembly 5 since all connecting assemblies 5 are identical. More specifically, the connecting assembly 5 essentially comprises a threaded stud 6a, 6b extending along an axis B, a nut 7 and a retaining ring not shown.

The stud 6a, 6b essentially comprises (FIGS. 1 to 4):
a thread 9 screwed onto a thread 8, in particular a nut screw, defined by a hole 23a, 23b formed in the casing 2;
a thread 10 (only schematically shown) on which the nut 7 is screwed with a given tightening torque value; and
a non-threaded portion 11, axially interposed between the threads 9, 10 and engaging with a radial clearance a seat 12 defined by the shell 4 and coaxial with a respective hole 23a, 23b of the casing 2.

The stud 6a, 6b further comprises a non-shown toothing interposed between the thread 10 and the portion 11.

With reference to FIGS. 2 and 3, 15 indicates a damaged area of the thread 8 to be reconditioned and defined by the hole 23a.

In the following description, the thread 8 to be reconditioned is referred to as damaged thread 8.

In particular, in the following of the present description, the stud 6a is associated with the hole 23a with the respective damaged thread 8 and the studs 23b are associated with the holes 23b arranged on respective opposite parts of the hole 23a and immediately adjacent to the hole 23a.

With reference to FIGS. 4 to 16, a tool for reconditioning the damaged thread 8 is indicated with 20.

The tool 20 comprises (FIGS. 4 and 5):
a bracket 21 arranged at the hole 23a of the casing 2 defining a hole 24 (FIGS. 6 to 16) engageable by a drill 25 and by a male element 26 adapted to interact with the damaged thread 8 and suitable to being centred on the hole 23a; and
two brackets 22 articulated on the bracket 21 and defining respective seats 19 engageable by respective studs 6a, 6b engaging respective holes 23b of the casing 2.

In the shown case, the hole 24 extends along an axis C. The holes 23b are further arranged on opposite sides with respect to the hole 23a and immediately adjacent to the hole 23a.

In more detail, the tool 20 is applied to the hole 23a of the casing 2 having the damaged thread 8 to be repaired in the configuration of FIG. 1, namely after that the nuts 7 have been unscrewed and the shell 4 has been removed from the casing 2 while keeping the transmission 1 supported and housed inside the casing 2.

The bracket 21 comprises (FIGS. 4 and 5):
a plate 27 defining a surface 28 adapted to abut against the circumferential edge 13 of the casing 2 at the hole 23a; and
an annular projection 29 projecting from the plate 27 on the opposite side of the surface 28.

The projection 29 extends coaxially to the axis C. The axis C coincides with the axis B of the hole 23a, when the tool 20 is mounted on the hole 23a (FIGS. 4 to 16).

The hole 24 includes, in particular:
a nut screw 30 axially arranged on the side of the hole 23a, when the tool 20 is mounted on the hole 23a; and
a portion 39, which is not threaded and is axially opposed to the nut screw 30.

The projection 29 further defines an annular shoulder 31 defining the portion 39 and defining an annular abutment surface 32.

The abutment surface 32 defines an axial end of the projection 29 arranged on the opposite side of the plate 27.

The tool 20 further includes:
a centering pin 33 (FIG. 7) to be used during a centering step of the axis C of the projection 29 on the axis B of the hole 23a;
a bush 40 (FIG. 8) defining a hole 41 that can be engaged by the drill 25 adapted to remove the damaged thread 8; and
a bush 50 (FIGS. 9 to 12) defining a hollow hole 51 that can be engaged by the male element 26 to generate a new thread 16 with a diameter larger than the one of the damaged thread 8.

In more detail, the pin 33 has a respective axis E.

The axis E coincides with the axes B, C, when the tool 20 is centred on the hole 23a and the pin 33 is coupled to the bracket 21.

The pin 33 comprises, proceeding along the axis E:
- a cover 34 adapted to abut against the abutment surface 32 during a centering step of the tool 20;
- a non-threaded portion 42 adapted to engage the portion 39 of the hole 24 during a centering step of the tool 20;
- a portion 35 defining a screw 37 screwed onto the nut screw 30 during a centering step of the tool 20;
- a connecting portion 36 having a frustoconical shape in the present case; and
- a non-threaded cylindrical section 38 adapted to engage the hole 23a.

Figure 8:
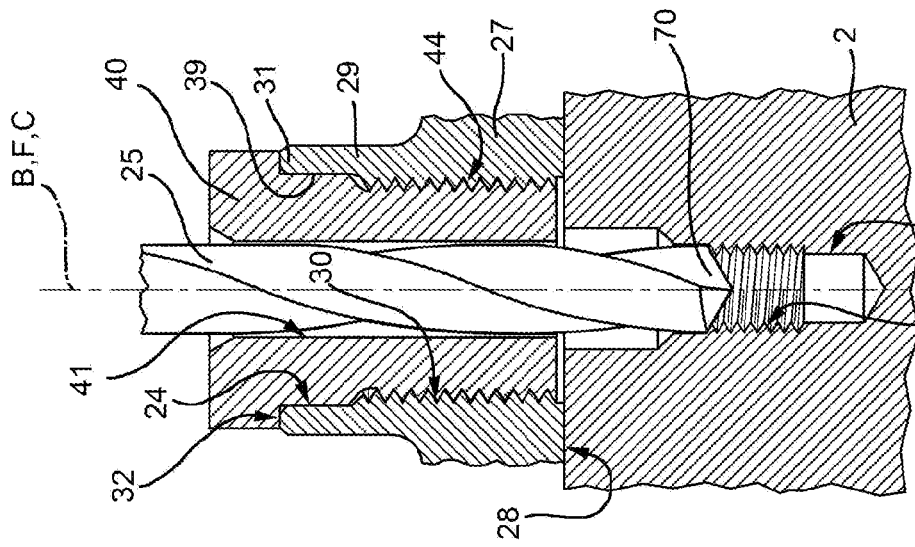
FIG. 8 shows, in a greatly enlarged scale, a step for removing the damaged thread according to the reconditioning method according to the present invention.

With reference to FIG. 8, the bush 40 has a tubular shape along an axis F and comprises a thread 44 that can be screwed onto the nut screw 30 of the bracket 21.

The axis F coincides with the axes B, C when the tool 20 is mounted on the hole 23a and the bush 40 is coupled to the bracket 21.

The inner diameter of the hole 41 is larger than the diameter of the drill 25, thus allowing this latter to be radially inserted into the hole 41.

With reference to FIGS. 9 to 12, the bush 50 has a tubular shape and the hole 51 has an axis G.

The G axis coincides with the axes B, C, when the tool 20 is centred on the hole 23a and the bush 50 is coupled to the bracket 21.

The bush 50 further comprises:
- a screw 53 that can be screwed onto the nut screw 30 of the bracket 21; and
- a nut screw 54 on which a thread 55 of the male element 26 can be screwed.

With reference to FIGS. 13 to 15, the tool 20 further comprises:
- an elongated installer 60; and
- a metal insert 61 defining a reported thread 62, also known as Heli-coil.

In more detail, the installer 60 is shaped like a rod having a hooked end 63 engaging the insert 61.

The insert 61 is shaped like a helical spring.

During a damaged thread repair step 8, the installer 60 and the insert 61 are coaxially inserted together with the axes B, C mutually coinciding inside the hole 24 so that the insert 61 is screwed into the new thread 16.

Then (FIG. 15), the installer 60 is withdrawn and the inner diameter of the insert 61 defines the reconditioned thread 8'.

The operation of the tool 20 is described below.

In case of damage to the thread 8 defined by the hole 23a, the nuts 7 of the studs 6a, 6b are unscrewed and the shell 4 is removed from the casing 2 while keeping the transmission 1 supported and housed inside the casing 2 (FIG. 1).

Below, the tool 20 is applied on the casing 2.

In particular, the bracket 21 is arranged at the hole 23a having the damaged thread 8 and the brackets 22 are arranged at respective holes 23b immediately adjacent to the hole 23a.

The brackets 22 are arranged so that the respective seats 19 are engaged by the studs 6 screwed into the respective holes 23b.

The reconditioning of the damaged thread 8 of the transmission 1 provides the following steps:
- centering the tool 20 on the hole 23a (FIG. 7);
- inserting the drill 25 inside the tool 20 and removing the damaged thread 8 by means of the drill 25 (FIG. 8);
- inserting the male element 26 inside the tool 20 and creating a new thread 16 inside the hole 23a having a diameter larger than the one of said damaged thread 8 (FIGS. 9 to 12); and
- inserting the insert 61 inside the tool 20 so that said insert 61 engages the hole 23a free of the damaged thread 8, is screwed into the new thread 16 and defines the reconditioned thread 8';
- keeping said transmission 1 mounted on the helicopter 1 during the aforementioned steps.

Figure 7:
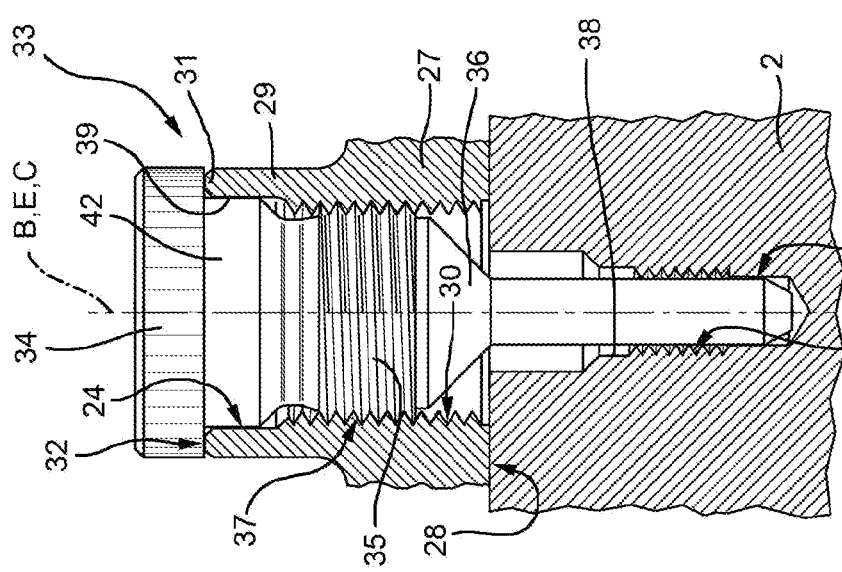
FIG. 7 shows in a greatly enlarged scale a centering step according to the reconditioning method according to the present invention.
Figure 6:
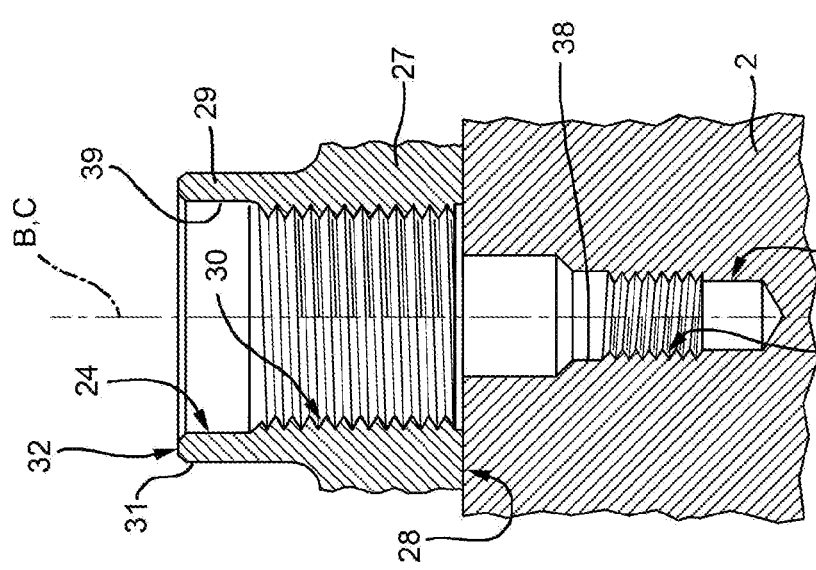
FIG. 6 is a section view on a greatly enlarged scale of the reconditioning tool of FIGS. 4 and 5 in a coupling step to the thread to be repaired.

In more detail, with reference to FIG. 7, the pin 33 is inserted into the hole 23a of the bracket 21, so as to make the axis C of the hole 24 of the bracket 21 coaxial to the axis B of the hole 23a of the casing 2. In in this way, the bracket 21 is "centred" on the hole 23a with the damaged thread 8.

The screw 37 is screwed onto the nut screw 30 of the bracket 21 so as to insert the portion 38 inside the hole 23a and to bring the cover 34 into abutment against the surface 32.

At the end of this operation, the axis C of the hole 24 of the bracket 21 coincides with the axis B of the hole 23a, i.e. the tool 20 is in a "centred" position on the hole 23a.

Then, the nuts 7 are screwed onto the portions 11 of the aforementioned studs 6b adjacent to the hole 23a, so as to fix the tool 20 in a "centred" position on the hole 23a. Now (FIG. 8), the bush 40 is inserted into the hole 24. In particular, the thread 44 of the bush 40 is screwed onto the nut screw 30 of the bracket 21. At the end of this operation, the axis F of the bush 40 coincides with the axes C, B of the respective holes 24, 23a.

Subsequently, the drill 25 is inserted into the hole 41 of the bush 40 until the relative tip 70 engages the hole 23a of the casing 2 and is arranged at the damaged area 15 of the damaged thread 8.

The actuation of the drill 25 allows the damaged thread 8 to be removed by rotating the tip 71 of the drill 25, as shown in FIGS. 9 and 10.

Now, the drill 25 is extracted from the hole 41, the bush 40 is unscrewed and extracted from the bracket 21 and compressed air is introduced into the hole 24 to accurately clean the hole 23a.

Then (FIG. 9), the bush 50 is inserted into the hole 24. In particular, the screw 53 of the bush 50 is screwed onto the nut screw 30 of the bracket 21. At the end of this operation, the axis G of the bush 50 coincides with the axes C, B of the respective holes 24, 23a.

Subsequently, the male element 26 is inserted into the hole 51 of the bush 50 (FIG. 10) and is screwed onto the nut screw 54 of the bush 50 until the relative tip 71 creates the new thread 16 in the hole 23a. This new thread 16 has a diameter larger than the one of the damaged thread 8 (FIG. 11).

Now, the male element 26 is extracted from the hole 51, the bush 50 is unscrewed from the bracket 21 and compressed air is introduced into the hole 24 to accurately clean the hole 23a.

Then (FIG. 13), the installer 60 and the metal insert 61 are inserted together into the hole 24 of the bracket 21 until the insert 61 is screwed into the new thread 16 previously formed in the hole 24 (FIG. 14).

The installer 60 is extracted from the hole 24 (FIG. 15) and the inner diameter of the insert 61 defines a reconditioned thread 8' having the same diameter as the damaged thread 8 (FIGS. 16 and 17).

The thread 8' now defines the reconditioned thread 8.

Now the nuts 7 of the studs 6 engaging the seats 19 of the brackets 22 are removed and the tool 20 is removed from the casing 2.

The shell 4 is mounted again on the casing 2 and locked thereon by screwing the nuts 7 onto the respective studs 6a, 6b.

From an examination of the characteristics of the tool 20 and of the method according to the present invention, its advantages are quite clear.

In particular, the method according to the present invention comprises the following steps:

centering the tool 20 on the hole 23a;

inserting the drill 25 inside the tool 20 centred on the hole 23a and removing the damaged thread 8;

inserting a male element 26 inside the tool 20 and creating a new thread 16 inside the hole 23a having a diameter larger than the one of said damaged thread 8; and screwing the insert 61 inside said new thread 16 so as to define a reconditioned thread 8'.

The aforementioned steps are carried out while keeping the transmission 1 mounted on the casing 2 and, therefore, on the helicopter 1.

Unlike the known solutions described in the introductory part of the present description, this one allows reconditioning the damaged thread 8 while keeping the casing 2 mounted on the helicopter 1.

Thanks to this, the reconditioning of the damaged thread 8 does not require the removal of the transmission 1 and its sending to a repair centre.

It is thus possible to recondition the damaged thread 8 in a way that is far less expensive and requires an interruption of the helicopter operation far shorter than the one needed in the known and previously indicated solutions.

The tool 20 further includes:

a bracket 21 arranged at the hole 23a and defining a hole 24 engaged by the drill 25, by the male element 26 and by the insert 61 during the reconditioning of the damaged thread 8; and a pair of brackets 22 locked by the nuts 17 of respective studs 6b engaging holes 23b adjacent to the holes 23a.

In this way, on the one hand the bracket 21 allows the correct positioning of the drill 25, of the male element 26 and of the insert 61 by means of the bushes 40, 50 inserted into the hole 24; on the other hand, the bracket 21 also allows locking the brackets 22 by means of the nuts 7 of the studs 6b and centering the axis C of the hole 24 on the axis B of the hole 23b having the damaged thread 8.

This results in a high ease of construction and a high final precision of the reconditioned thread 8'.

Finally, it is clear that modifications and variations that do not leave the scope of protection defined by the appended claims can be made to the tool 20 and to the method here described and shown.

In particular, the studs 6a, 6b could be replaced by respective bolts having respective nuts 7.

Furthermore, transmission 1 could be mounted on a convertiplane rather than on a helicopter.

Finally, the shell 4 could be defined by an operating group different from the pto 3, provided that the removal of the shell 4 keeps the transmission 1 supported by the casing 2.

What is claimed is:

1. A method for reconditioning a damaged thread (8) of a transmission (1) of a hover-capable aircraft; said damaged thread (8) being arranged inside a first hole (23a) of said transmission (1);

said method comprising the following steps:
i) centering a tool (20) on said first hole (23a);
ii) inserting a first tool (25) inside said tool (20) centred on said first hole (23a) and removing the damaged thread (8) by means of said first tool (25);
iii) inserting a second tool (26) inside said tool (20) and creating a new thread (16) inside said first hole (23a) having a diameter larger than the one of said damaged thread (8); and
iv) screwing an insert (61) having a thread inside said new thread (16), so that said insert (61) engages said first hole (23a) and defines a reconditioned thread (8'); said step i) comprising the following steps:
v) inserting a pin (33) inside said tool (20) and inside said first hole (23a); and
vi) removing the pin (33);
wherein said step i) comprises the steps of:
vii) screwing said pin (33) onto a further thread (30) of said tool (20); and
viii) arranging said pin (33) in abutment against an abutment surface (32) of said tool (20);
said method further comprising the step of:
ix) keeping said transmission (1) mounted on the hover-capable aircraft during said steps i), ii), iii), vii).

2. The method according to claim 1, wherein before said step i), the method comprises the following further steps:
x) removing a plurality of connecting elements (6a, 6b) interposed between said casing (2) and said transmission (4), engaging respective said first hole (23a) and second holes (23b) of said transmission (1) and on which respective nuts (7) are screwed; said casing (2) defining said first hole (23a) and said second holes (23b); and
xi) removing said shell (4) from said casing (2) while maintaining said transmission (1) supported by said casing (2).

3. The method according to claim 2, wherein after said steps x) and xi), the method comprises the following further steps:
xii) arranging a first bracket (21) of said tool (20) at said first hole (23a) before said step i); and
xiii) arranging a pair of additional brackets (22) of said tool (20) at respective second holes (23b) of said transmission (1) before said step i).

4. The method according to claim 3, wherein the method further comprises the following steps:
xiv) screwing said nuts (7) onto the respective connecting elements (6b) engaging the respective said second holes (23b), during said step i).

5. The method according to claim 1, wherein said step ii) comprises the following steps:
xv) inserting a first bush (40) inside said tool (24);
xvi) arranging said first tool (25) inside a third hole (41) of said first bush (40) until a first operating end (70) of said first tool (25) is brought in correspondence with said thread to be removed (8) and inside said first hole (23a); and
xvii) actuating said first tool (25) so as to remove said damaged thread (8).

6. The method according to claim 1, wherein said step iii) comprises the following steps:
xviii) inserting a second bush (50) inside said tool (20); and xix) screwing said second tool (26) onto a nut screw (54) arranged inside a further fourth threaded hole (51) of said second bush (50) until a second operating end (71) of said second tool is brought (26) inside said first hole (23*a*).

7. The method according to claim 1, wherein said step iii) comprises the further step xx) of screwing said insert (61) inside said new thread (16).

8. The method according to claim 1, wherein said step ii) comprises the further step xxi) of arranging said first bush (40) against said abutment surface (32); and/or wherein said step iii) comprises the further step xxii) of arranging said second bush (50) against said abutment surface (32).

* * * * *